（12） United States Patent
Fukuda

(10) Patent No.: US 8,856,468 B2
(45) Date of Patent: Oct. 7, 2014

(54) MEMORY DEVICE CAPABLE OF IMPROVING WRITE PROCESSING SPEED AND MEMORY CONTROL METHOD

(75) Inventor: Tohru Fukuda, Nishitokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 532 days.

(21) Appl. No.: 13/278,973

(22) Filed: Oct. 21, 2011

(65) Prior Publication Data

US 2012/0140561 A1    Jun. 7, 2012

(30) Foreign Application Priority Data

Dec. 1, 2010  (JP) ................................. 2010-268482

(51) Int. Cl.
*G06F 12/00* (2006.01)
*G06F 12/02* (2006.01)
*G06F 3/06* (2006.01)

(52) U.S. Cl.
CPC ............ *G06F 12/0246* (2013.01); *G06F 3/061* (2013.01); *G06F 2212/7201* (2013.01); *G06F 3/0679* (2013.01)
USPC ......................................... 711/156; 711/158

(58) Field of Classification Search
USPC ................................................ 711/156, 158
See application file for complete search history.

(56) References Cited

U.S. PATENT DOCUMENTS

| 5,400,337 | A  | * | 3/1995 | Munter ........................ 370/399 |
| 6,725,322 | B1 | * | 4/2004 | Shiraishi et al. ............. 711/103 |
| 7,511,646 | B2 | * | 3/2009 | Cornwell et al. ............ 341/126 |
| 8,099,730 | B2 | * | 1/2012 | Wang et al. ...................... 718/1 |

FOREIGN PATENT DOCUMENTS

| JP | 63-075948 | 4/1988 |
| JP | 63-093055 | 4/1988 |
| JP | 2001-265750 | 6/2001 |
| JP | 2001-184254 | 7/2001 |
| JP | 2006-172495 | 6/2006 |

OTHER PUBLICATIONS

Japanese Office Action mailed on Apr. 9, 2013 in connection with Application No. 2010-268482.

* cited by examiner

*Primary Examiner* — Reba I Elmore
(74) *Attorney, Agent, or Firm* — Knobbe Martens Olson & Bear LLP

(57) ABSTRACT

According to one embodiment, a memory device includes a memory unit, a first storage unit, a second storage unit, a third storage unit, a data move unit, and a controller. The first storage unit stores a logical address and an intermediate address. The second storage unit stores the intermediate address and the physical address corresponding to the intermediate address. The third storage unit stores a flag corresponding to the logical address and the intermediate address. The flag represents whether read of latest data by a read operation has succeeded. When the flag stored in the third storage unit represents a success of the read of the latest data, the controller determines whether write has been done for the same logical address of the memory unit during the data move processing, and if the write has been done, invalidates the data move processing.

11 Claims, 20 Drawing Sheets

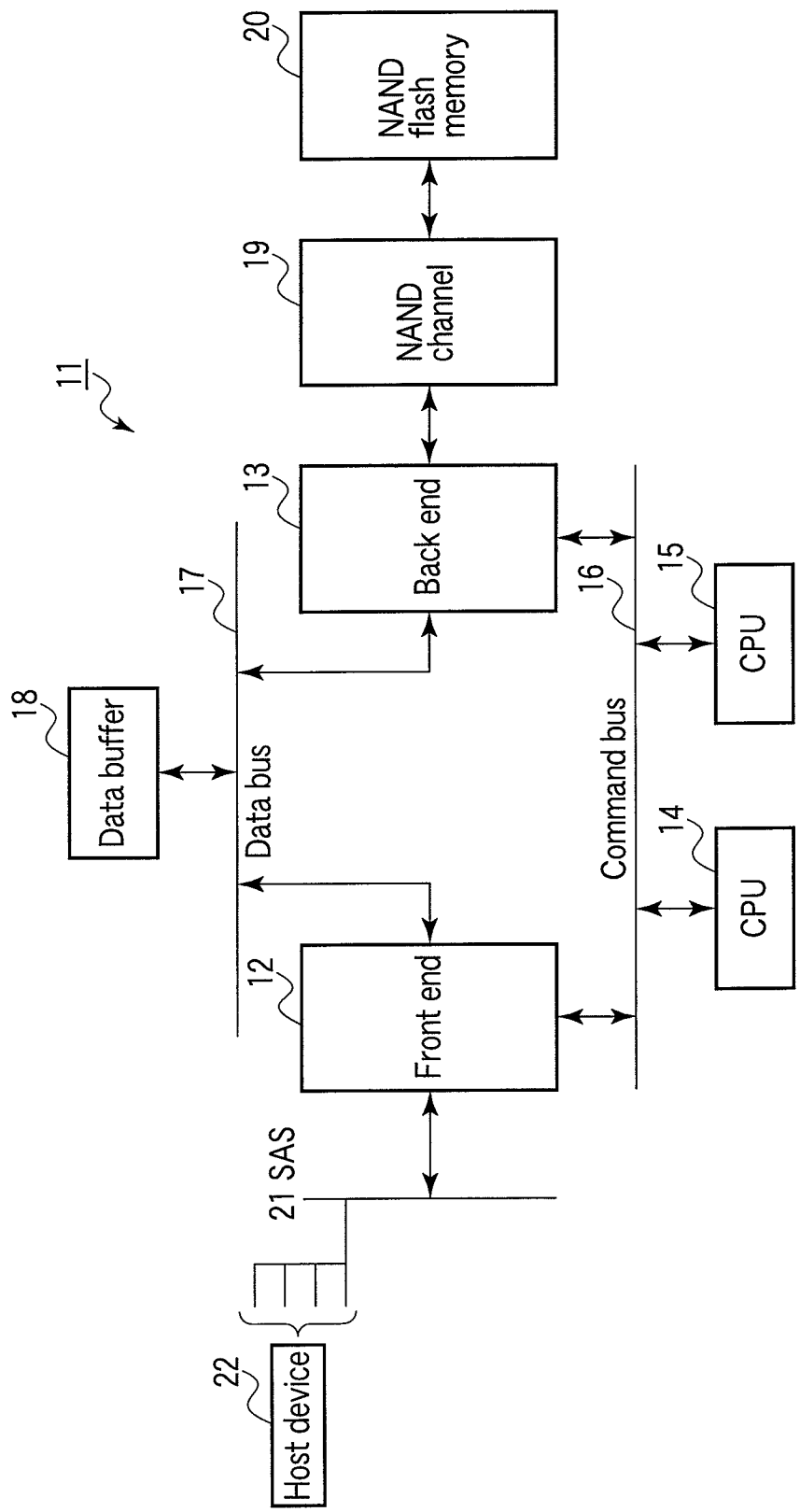
F I G. 1

MEMORY DEVICE CAPABLE OF IMPROVING WRITE PROCESSING SPEED AND MEMORY CONTROL METHOD

CROSS-REFERENCE TO RELATED APPLICATIONS

This application is based upon and claims the benefit of priority from prior Japanese Patent Application No. 2010-268482, filed Dec. 1, 2010, the entire contents of which are incorporated herein by reference.

FIELD

Embodiments described herein relate generally to a memory device and a memory control method applied to, for example, a solid-state drive (SSD).

BACKGROUND

The SSD has recently been developed as an alternate to the hard disk. This memory device uses a NAND flash memory as the storage medium, and adopts a write once method and an address translation method of translating a logical address to a physical address. To reduce the free spaces and save the capacity, this memory device executes write data move processing. When data move processing and user data write to the same logical address are performed in parallel, the position of latest data recorded in the address translation table is lost. To avoid this, the user data write waits in such a case.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram schematically showing a memory device according to the embodiment;

DETAILED DESCRIPTION

Figure 2:
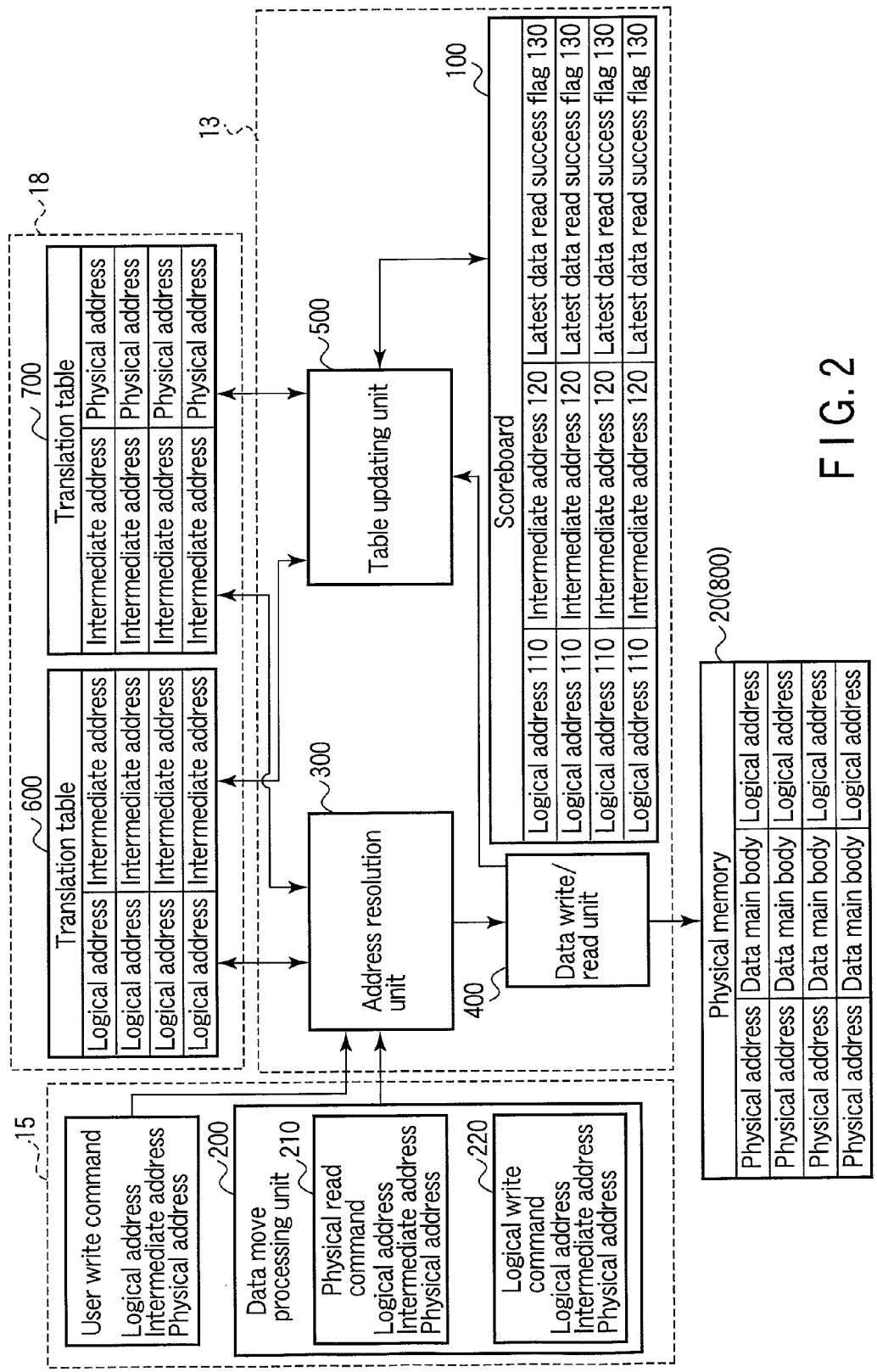
FIG. 2 is a block diagram schematically showing part of the arrangement shown in FIG. 1.

Various embodiments will be described hereinafter with reference to the accompanying drawings.

In general, according to one embodiment, a memory device includes a memory unit, a first storage unit, a second storage unit, a third storage unit, a data move unit, and a controller. The first storage unit stores a logical address and an intermediate address. The intermediate address corresponds to the logical address and is used to estimate a physical address of the memory unit. The second storage unit stores the intermediate address and the physical address corresponding to the intermediate address. The third storage unit stores a flag corresponding to the logical address and the intermediate address. The flag represents whether read of latest data by a read operation using the logical address and the intermediate address has succeeded. The data move unit moves data in the memory unit. In data move processing by the data move unit, when the flag stored in the third storage unit represents a success of the read of the latest data, the controller determines whether write has been done for the same logical address of the memory unit during the data move processing, and if the write has been done, invalidates the data move processing.

FIG. 1 is a block diagram showing the schematic arrangement of a memory system according to the embodiment. A memory system 11 includes a front end 12, a back end 13, a CPU 14, a CPU 15, a command system bus (to be referred to as a command bus hereinafter) 16, a data system bus (to be referred to as a data bus hereinafter) 17, a data buffer 18, a NAND channel 19, a NAND flash memory 20, and an SAS (Serial Attached SCSI) 21.

The front end 12 is controlled by the CPU 14. When writing data, the front end 12 receives a command, data, and an address from a host device 22 via the SAS 21, supplies the data to the data buffer 18 via the data bus 17, and supplies the command and the address to the CPU 14 via the command bus 16. When reading data, the front end 12 transfers, via the SAS 21 to the host device 22, data read from the NAND flash memory 20 and held in the data buffer 18 via the NAND channel 19, the back end 13, and the data bus 17.

The back end 13 is controlled by the CPU 15. The back end 13 has, for example, a command queue which receives a command from the CPU 15 via the command bus 16. When writing data, the back end 13 receives data from the data buffer 18 via the data bus 17 and transfers the data to the NAND flash memory 20 via the NAND channel 19. When reading data, the back end 13 receives, via the NAND channel 19, data read from the NAND flash memory 20 and transfers it to the data buffer 18 via the data bus 17. The back end 13 includes an address resolution unit, a data write/read unit, a table update unit, a scoreboard, and the like and manages the addresses, data, and various kinds of protocols of the NAND flash memory 20, as will be described later.

The data buffer 18 is formed from, for example, a RAM (Random Access Memory), and stores data supplied from the front end 12 and the back end 13 via the data bus 17 and also address translation tables to be described later.

The NAND flash memory 20 has a memory cell array serving as a memory unit having a plurality of memory cells arranged in a matrix, and adopts an address translation method of translating a logical address to a physical address and a write once method of sequentially writing data in a free area on a page-by-page basis. In addition, the NAND flash memory 20 performs data move processing of moving written data to a free area to reduce wasteful free areas.

FIG. 2 shows the schematic functions of the data buffer 18, the back end 13, the CPU 15, and the NAND flash memory 20 (800).

The data buffer 18 includes translation tables 600 and 700 serving as first and second storage units, respectively. The entire physical memory of the NAND flash memory 20 has a logical address set for every predetermined number of pages (for example, several thousand pages). Some of the logical addresses are stored in the translation table 600 together with intermediate addresses. The intermediate address is used to estimate the physical address. When all entries of the translation table 600 are used up, a request is issued to the CPU 15, and the CPU 15 prepares, in the data buffer 18, a new translation table 600 having free entries.

The translation table 700 stores intermediate addresses assigned in correspondence with the physical addresses of the NAND flash memory 20 together with the physical addresses. Like the translation table 600, if all intermediate addresses in the translation table 700 are used up, a request is issued to the CPU 15, and the CPU 15 prepares a new translation table 700 in the data buffer 18.

The back end 13 includes, for example, an address resolution unit 300, a data write/read unit 400, a table update unit 500, and a scoreboard 100.

Upon receiving a write command supplied from the CPU 15, the address resolution unit 300 translates a logical address supplied together with the write command from an intermediate address to a physical address using the translation tables 600 and 700.

The data write/read unit 400 is connected to the address resolution unit 300 and the table update unit 500 so as to control data write/read for the physical memory 800 (NAND flash memory 20). More specifically, in accordance with a write command, the data write/read unit 400 writes data, which is held in the data buffer 18, in the physical memory 800 based on a physical address assigned by the address resolution unit 300. In addition, the data write/read unit 400 reads data from the physical memory 800 in accordance with a read command. The data write/read unit 400 outputs a signal representing whether the data write or data read for the physical memory 800 has succeeded or not.

The table update unit 500 is connected to the data write/read unit 400, the translation tables 600 and 700, and the scoreboard 100 so as to search the translation tables 600 and 700 in data write/read and update necessary addresses in data write. The table update unit 500 also updates the contents of the scoreboard 100 in data read.

The scoreboard 100 stores intermediate addresses 120 in correspondence with logical addresses 110 and also stores latest data read success flags 130 each representing whether read of latest data has succeeded or not.

A data move processing unit 200 performs processing of reading already written data and writing the read data in a newly allocated area. For example, when data stored in a storage area (block) is partially rewritten, it is necessary to write the new rewritten data in a new block after erase and also read the remaining unrewritten data from the old block and write it in the new block. The data move processing unit 200 executes such data move processing.

Figure 3:
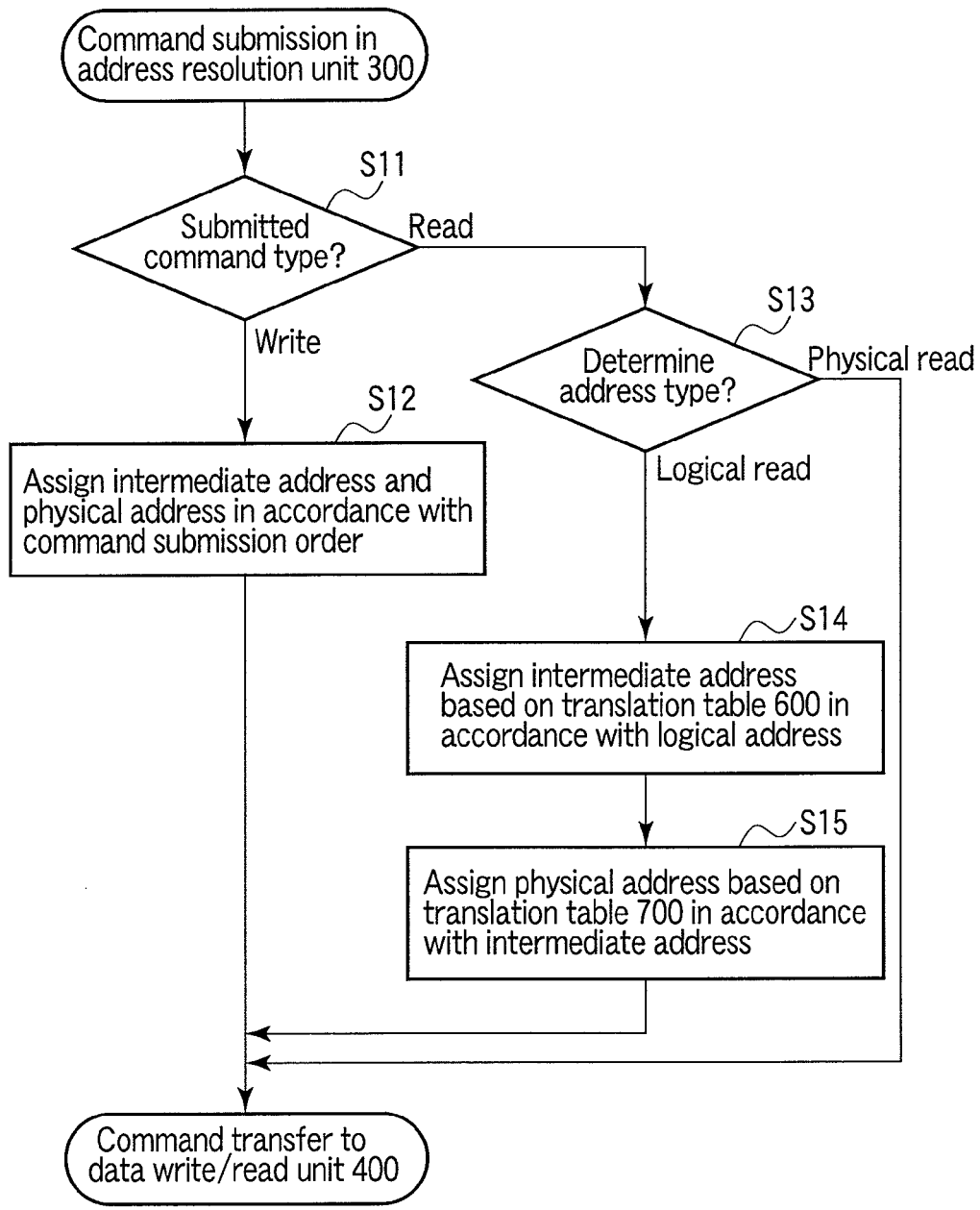
FIG. 3 is a flowchart illustrating the operation of an address resolution unit shown in FIG. 2.

FIG. 3 illustrates the operation of the address resolution unit 300 in detail. The address resolution unit 300 receives a command issued by the CPU 15 when, for example, writing user data, and receives a command issued by the table update unit 500 in data move processing.

Upon receiving a supplied command, the address resolution unit 300 determines the command type (S11). If the supplied command is determined to be a write command, the address resolution unit 300 looks up the translation table 700 and assigns an intermediate address and a physical address preset in it to the command in accordance with the command submission order (S12).

If the supplied command is determined to be a read command, the address resolution unit 300 determines what is the type of the address added to the command, i.e., logical address or physical address (S13). Upon determining that the address is a physical address, the processing ends without address resolution.

On the other hand, if the address is determined to be a logical address, the address resolution unit 300 searches the translation table 600 for a logical address that matches the logical address added to the command, and reads an intermediate address corresponding to the logical address (S14). Next, the address resolution unit 300 searches for the translation table 700 for an intermediate address that matches the read intermediate address, and reads a physical address corresponding to the found intermediate address. This physical address is assigned to the input command (S15).

Figure 4:
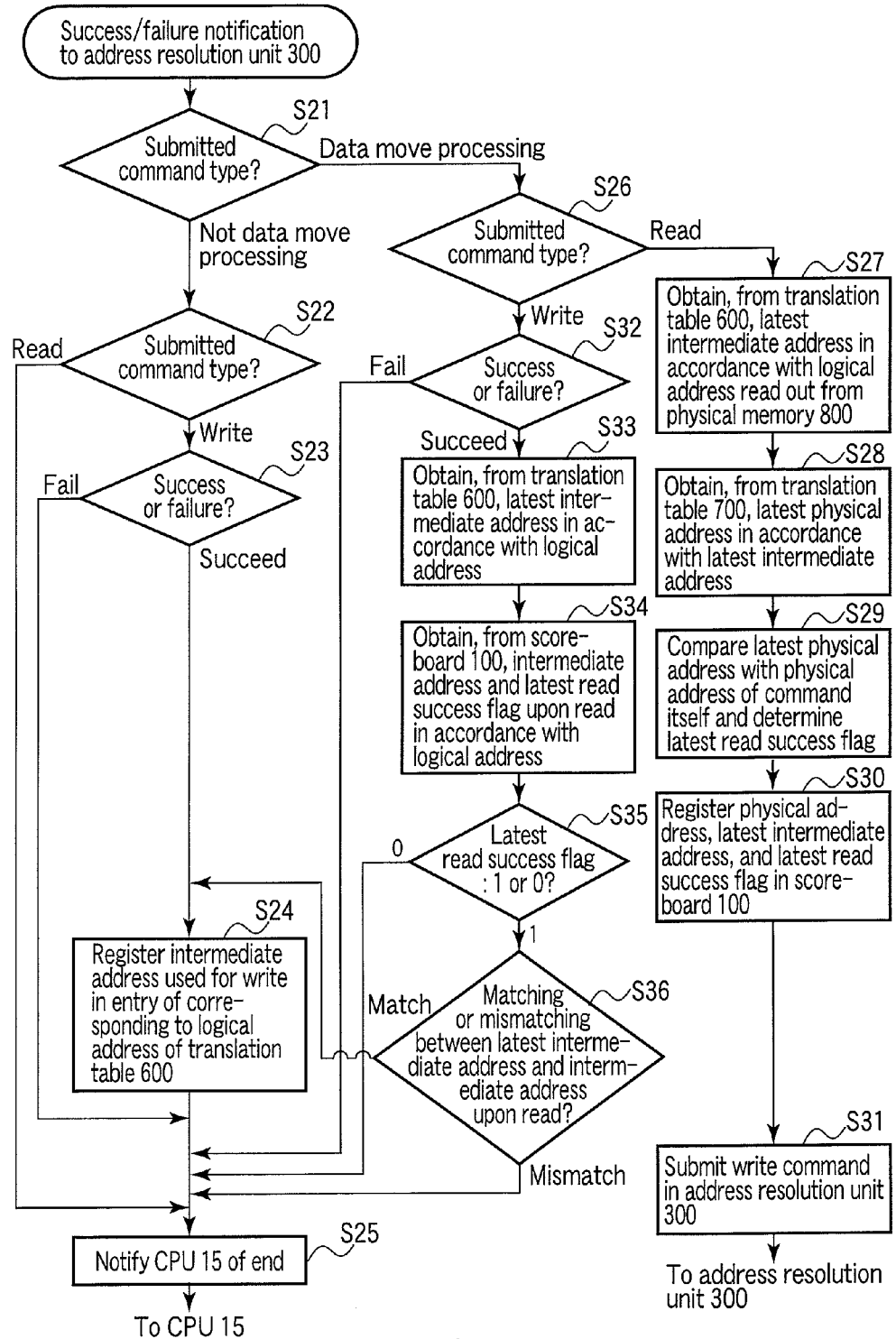
FIG. 4 is a flowchart illustrating the operation of a table update unit shown in FIG. 2.

FIG. 4 illustrates the operation of the table update unit 500 in detail. As will be described later, upon ending the data write or read processing, the data write/read unit 400 outputs a signal representing whether the write has succeeded or not or a signal representing whether the read has succeeded. The table update unit 500 operates in accordance with these signals.

The table update unit 500 first determines the type of the currently supplied command. More specifically, the table update unit 500 determines whether the command is of data move processing (S21). Upon determining that the command is not of data move processing, the table update unit 500 determines whether the supplied command is a read command or a write command (S22). If the command is a read command, the CPU 15 is notified of the end of the processing (S25).

Upon determining that the supplied command is a write command, the table update unit 500 determines the signal representing whether the write has succeeded or not, which is supplied from the data write/read unit 400 (S23). If the write has failed, the CPU 15 is notified of the end of the processing (S25). If the write has succeeded, the table update unit 500 registers the intermediate address used for the write in the entry of the corresponding logical address of the translation table 600 (S24). After that, the CPU 15 is notified of the end of the processing (S25).

On the other hand, if it is determined in step S21 that the supplied command is a data move processing command, the table update unit 500 determines whether the command is a write command or a read command (S26).

Upon determining that the supplied command is a read command, the table update unit 500 obtains the latest intermediate address from the translation table 600 in accordance with the logical address read from the physical memory 800 (S27). After that, the table update unit 500 obtains the latest physical address from the translation table 700 in accordance with the latest intermediate address obtained from the translation table 600 (S28). Next, the latest physical address obtained from the translation table 700 is compared with the physical address added to the command. If the two physical addresses match, the read of the latest data is determined to have succeeded. If the two physical addresses do not match, the read of the latest data is determined to have failed (S29). Then, the logical address, the latest intermediate address, and the latest read success flag are registered in the scoreboard 100 (S30). Upon determining that the read of the latest data has succeeded, the latest data read success flag 130 in the scoreboard 100 is set to "1". Upon determining that the read has failed, the latest data read success flag 130 in the scoreboard 100 is set to "0". After that, a write command is supplied to the address resolution unit 300 (S31).

On the other hand, upon determining in step S26 that the command is a write command, the table update unit 500 determines the signal representing whether the write has succeeded or not, which is supplied from the data write/read unit 400 after performing a write operation based on the write command (S32). If the write has failed, the CPU 15 is notified of the end of the processing (S25).

If the write has succeeded, the table update unit 500 obtains the latest intermediate address from the translation table 600 in accordance with the logical address added to the write command (S33). After that, the table update unit 500 searches the scoreboard 100 for the intermediate address at the time of read and the latest read success flag in accordance with the logical address added to the write command (S34). Next, the table update unit 500 determines whether the read latest read success flag is "0" or "1". If the flag is "0", the CPU 15 is notified of the end of the processing (S35).

If the flag is "1", the latest intermediate address found from the translation table 600 is compared with the intermediate address in the scoreboard 100 (S36). If they match upon comparison, the table update unit 500 registers the intermediate address used for the write in the entry of the corresponding logical address of the translation table 600 in step S24 (S24). On the other hand, if the two intermediate addresses do not match, the CPU 15 is notified of the end of the processing (S25).

Figure 5:
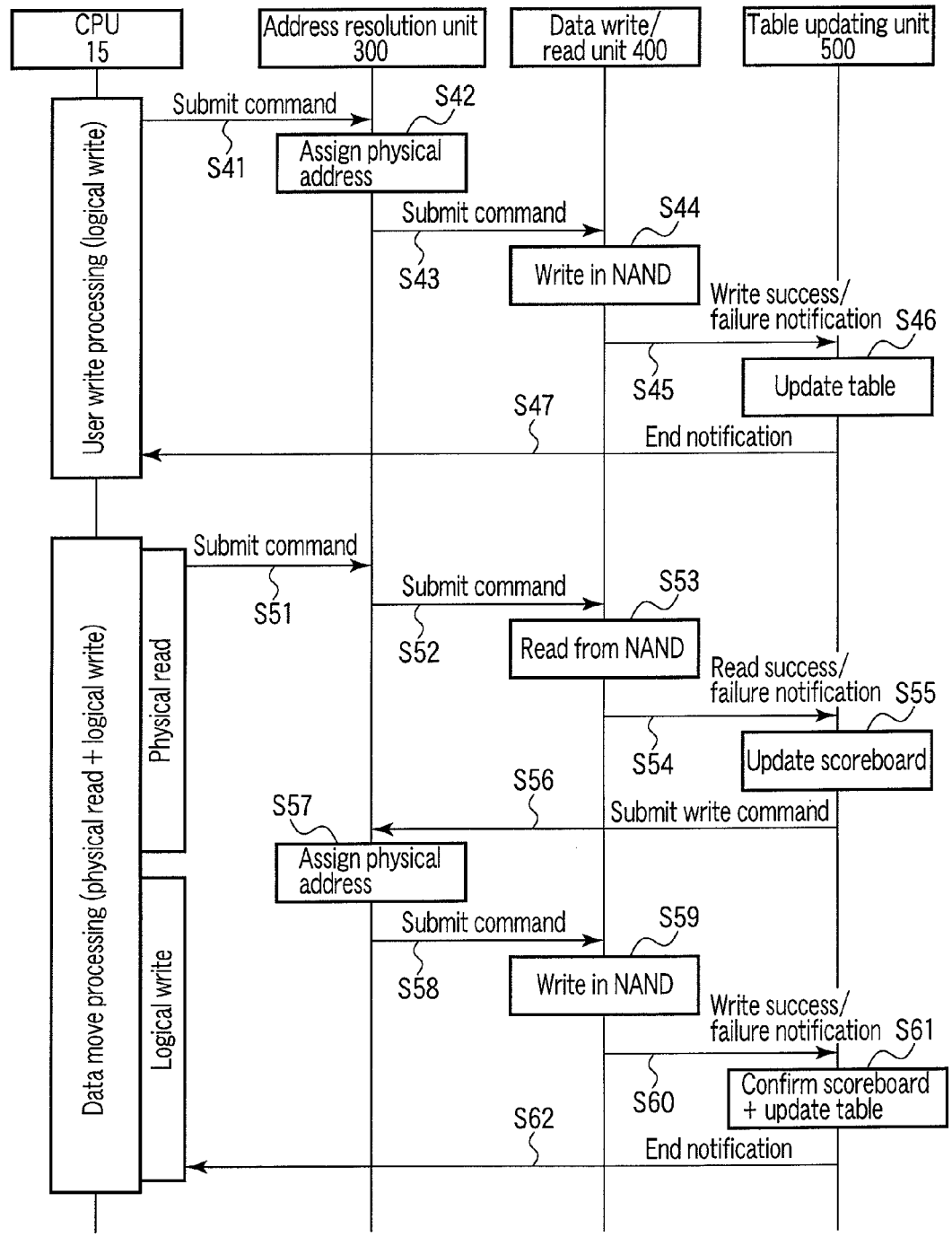
FIG. 5 is a sequence chart schematically showing the operation of data move processing according to the embodiment.

FIG. 5 shows the schematic operation sequences of the CPU 15, the address resolution unit 300, the data write/read unit 400, and the table update unit 500 shown in FIG. 2. The same reference numbers as in FIGS. 1 and 2 denote the same parts in FIG. 5. The operation of the arrangement in FIG. 2 will schematically be described with reference to FIG. 5.

In, for example, user data write processing, the CPU 15 first submits a write command in the address resolution unit 300 (S41). A logical address is added to the write command. The address resolution unit 300 obtains a physical address from the translation table 700 given in advance, and assigns it to the write command (S42). The address resolution unit 300 supplies the write command with the added physical address to the data write/read unit 400 (S43).

The data write/read unit 400 writes the data at the corresponding physical address of the physical memory 800 (NAND flash memory 20) (S44). At this time, the logical address added to the write command is written to the physical memory 800 as associated information together with the data.

Then, the data write/read unit 400 notifies the table update unit 500 whether the write has succeeded (S45). When notified by the data write/read unit 400 that the write has succeeded, the table update unit 500 updates the translation table 600 (S46). That is, the intermediate address is recorded in correspondence with the logical address in the translation table 600. When update of the translation table 600 is completed, the table update unit 500 sends an end notification to the CPU 15 (S47).

On the other hand, data move processing includes data read and data write processing. The data read processing is similar to that by the user. However, although the data read processing by the user uses a logical address, the data read processing in the data move processing uses a physical address.

In data move processing, when the CPU 15 outputs a physical read command, the address resolution unit 300 supplies it to the data write/read unit 400 without address resolution, unlike when using a logical address (S51 and S52). The data write/read unit 400 reads data directly from the physical memory 800 based on the physical address (S53). After the read operation, the data write/read unit 400 outputs a signal representing whether the read has succeeded or not (S54). Upon receiving the signal representing whether the read has succeeded from the data write/read unit 400, the table update unit 500 sets the latest data read success flag 130 in the scoreboard 100 in accordance with the signal (S55).

After that, the table update unit 500 generates a write command and supplies it to the address resolution unit 300 so as to write the read data (S56). That is, the table update unit 500 supplies the write command to the address resolution unit 300. The address resolution unit 300 assigns a physical address corresponding to a free block to the received write command by looking up the translation table 700 (S57), and supplies the physical address and the write command to the data write/read unit 400 (S58).

The data write/read unit 400 writes the read data in the physical memory 800 in accordance with the write command supplied from the address resolution unit 300 (S59). Then, the data write/read unit 400 outputs a signal representing whether the write has succeeded or not (S60). Upon receiving the signal representing that the write has succeeded from the data write/read unit 400, the table update unit 500 checks the scoreboard 100 and updates the translation table 600 (S61). More specifically, if the latest data read success flag in the scoreboard 100 represents success, the translation table 600 is updated. After that, the table update unit 500 supplies an end notification to the CPU 15 (S62).

FIGS. 6A, 6B, 6C, and 6D show a comparative example without using the embodiment. This comparative example indicates the states of the translation tables 600 and 700 and the physical memory 800 when the latest data positions contradict because of user write during data move processing.

In this memory device, data move processing is performed by reading latest data from the physical memory 800 based on a physical read command and then moving the data to new intermediate and physical addresses based on a logical write command.

Figure 6A:
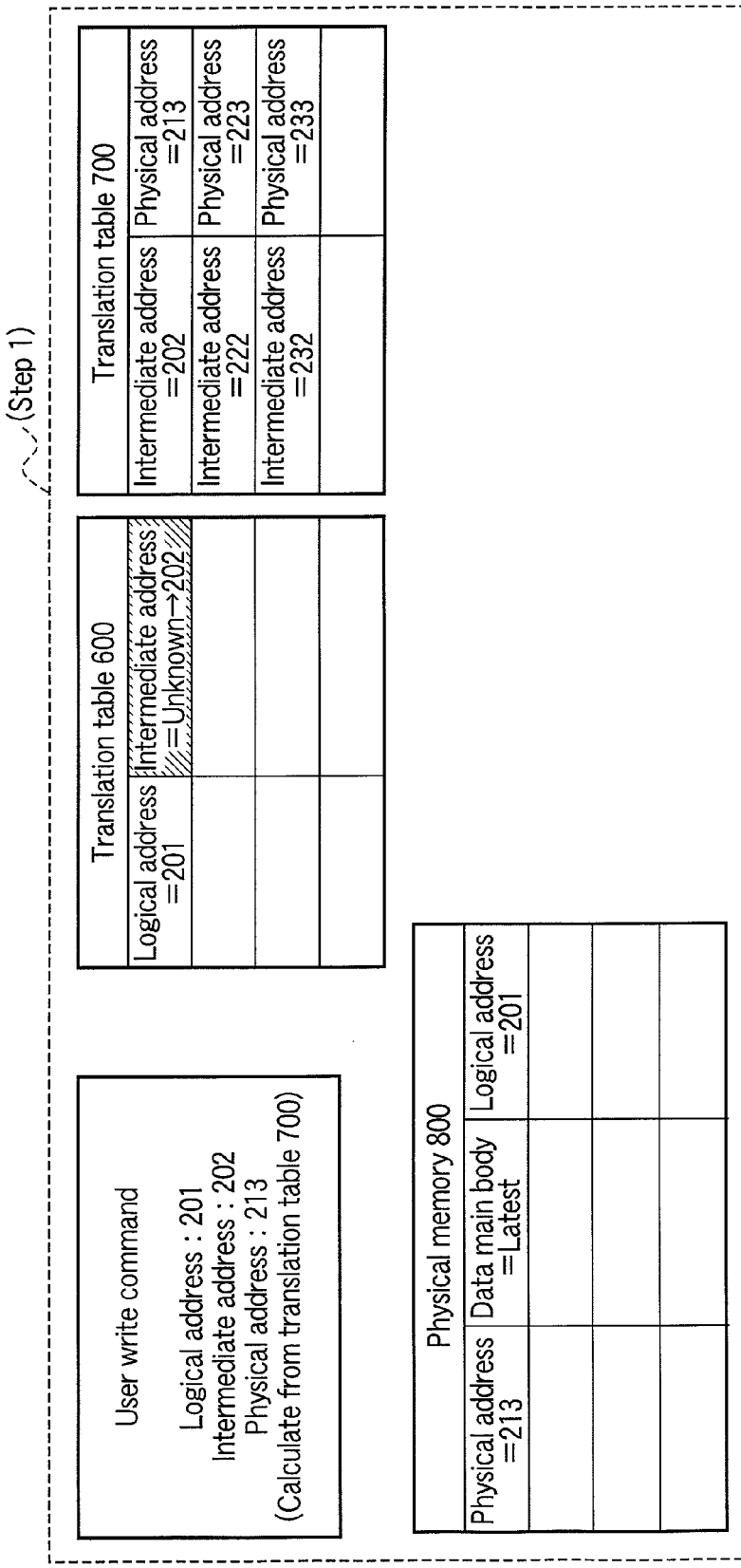
FIG. 6A is a view showing part of the arrangement in FIG. 2 so as to compare the operation of the embodiment.

FIG. 6A (step 1) shows the state immediately after data of logical address=201, which is the data move target, has been written. The data is written at physical address=213 of the physical memory 800, and intermediate address=202 corresponding to it is registered in the entry of logical address=201 of the translation table 600. In addition, logical address=201 is written in correspondence with physical address=213 of the physical memory 800.

Figure 6B:
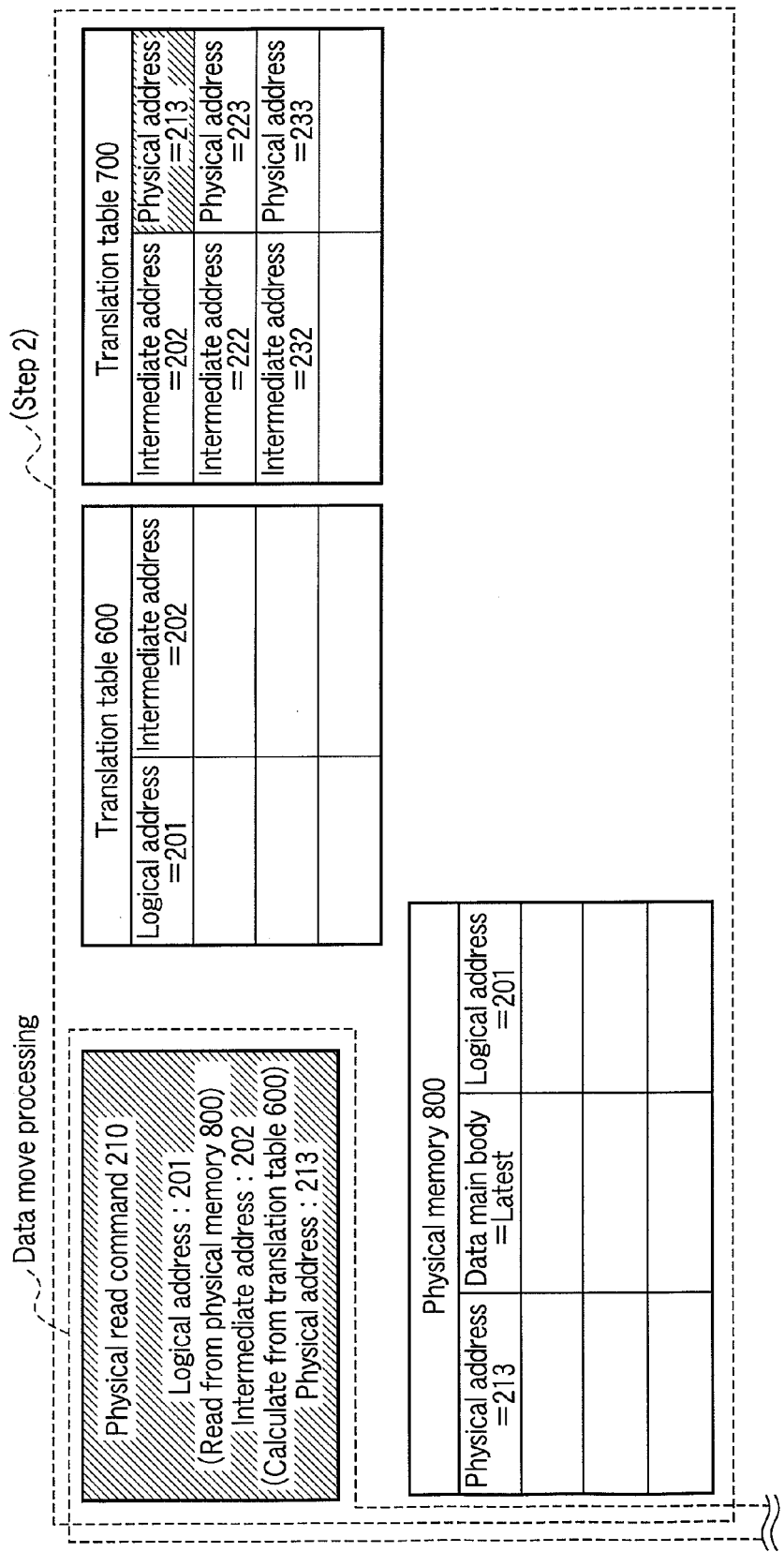
FIG. 6B is a view showing an operating state different from that in FIG. 6A.

FIG. 6B (step 2) shows a case in which the data of physical address=213 written immediately before is read based on a physical read command 210 as part of data move processing. This data is the latest at this point of time as the data of logical address=201.

Figure 6C:
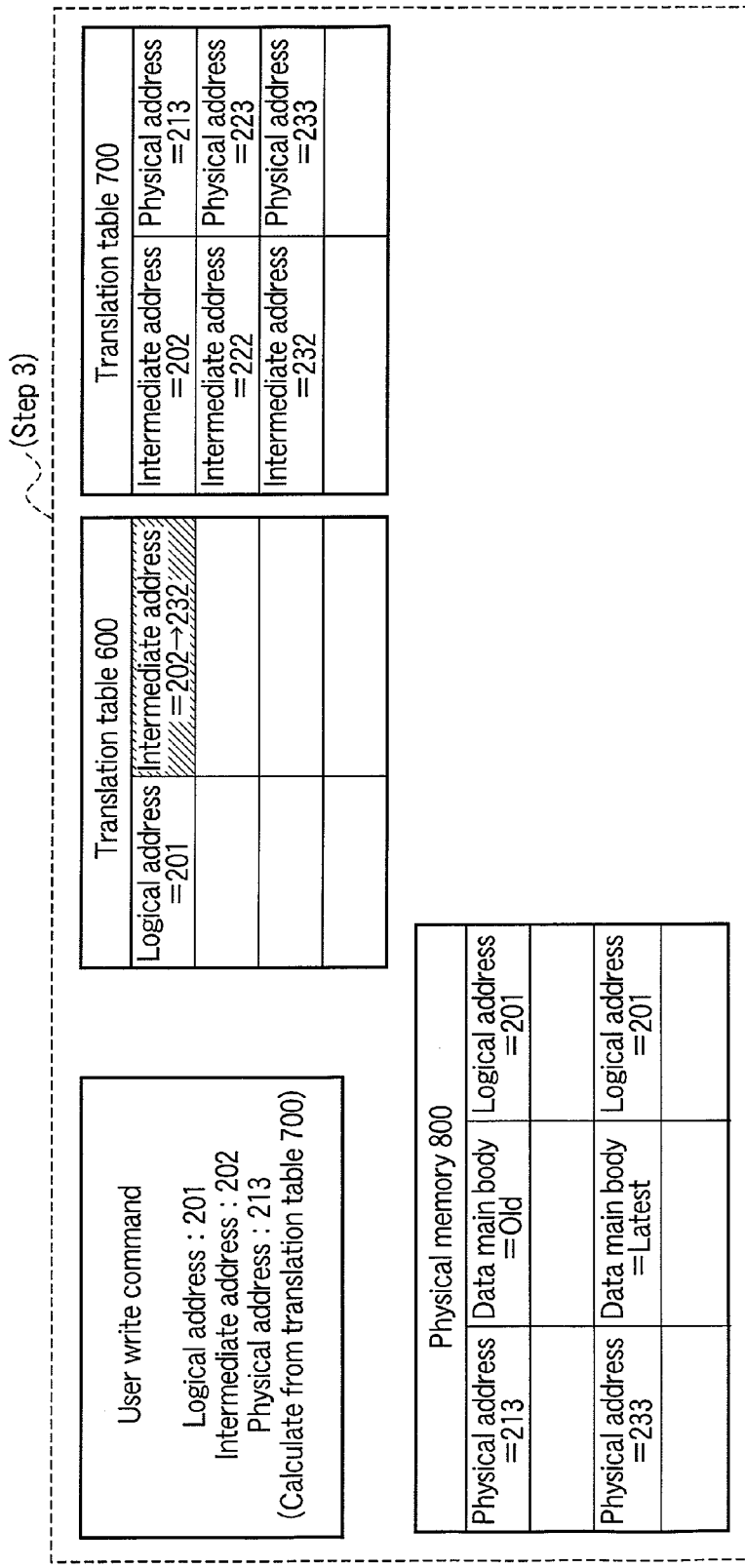
FIG. 6C is a view showing an operating state different from that in FIG. 6B.

FIG. 6C (step 3) shows a case in which a new user write command for logical address=201 used in step 2 is executed. In this case, the new data is written at physical address=233 of the physical memory 800. Hence, new intermediate address=232 is registered in the entry of logical address=201 of the translation table 600. The data of physical address=213 is old at this point of time. Hence, the data read in step 2 is old, too.

Figure 6D:
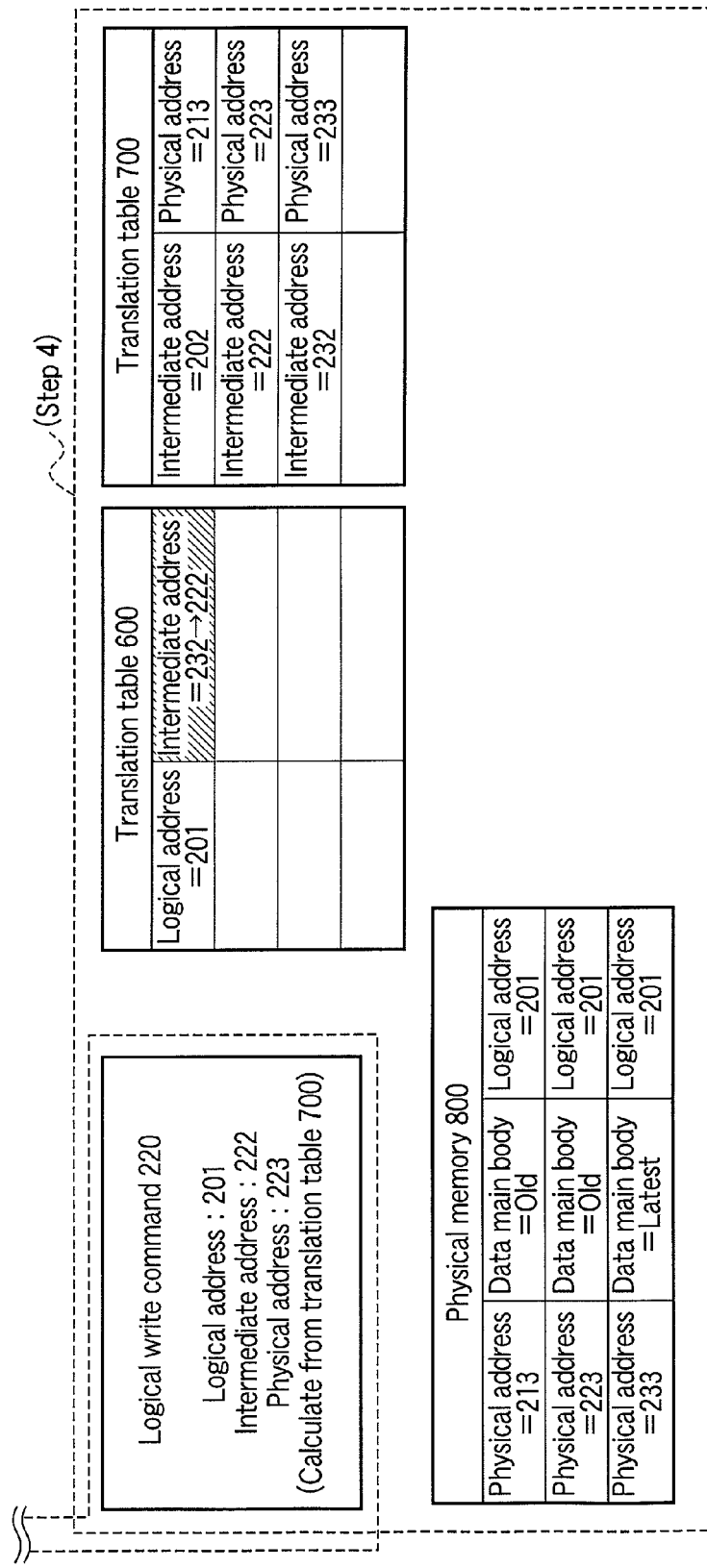
FIG. 6D is a view showing an operating state different from that in FIG. 6C.

FIG. 6D (step 4) shows a case in which the old data read in step 2 is written at physical address=223 by a logical write command as part of data move processing. If this embodiment is not used, the translation table 600 is updated to intermediate address=222 corresponding to the physical address=223 in accordance with the above-described procedure. As a result, the entry of logical address=201 of the translation table 600 indicates not the latest data but the old data. For this reason, the information of the latest data position is lost.

Hence, when this embodiment is not applied, the user write command to the same logical address needs to be prohibited during the data move processing to avoid the above-described phenomenon. For this reason, the processing speed of the user write command lowers.

Conversely, FIGS. 7A, 7B, 7C, and 7D show data move processing according to the embodiment in detail, indicating the states of the translation tables 600 and 700, the physical memory 800, and the scoreboard 100 in the data move processing.

Figure 7A:
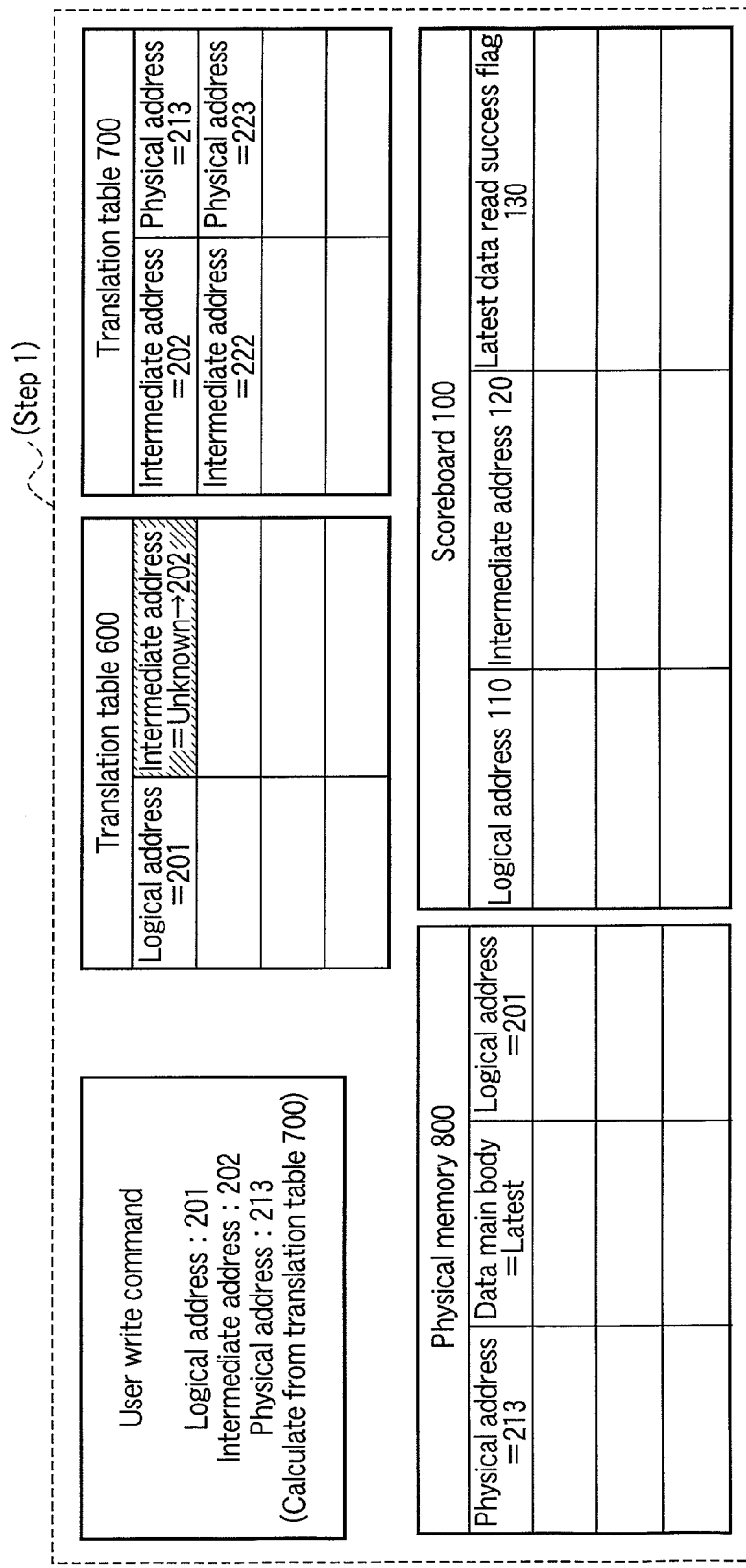
FIG. 7A is a view showing part of the arrangement in FIG. 2 so as to indicate the operation of the embodiment.

FIG. 7A (step 1) shows a state in which the data move target has been written based on a user write command. That is, FIG. 7A shows the state immediately after the data of logical address=201, which is the data move target, has been written. The data is written at physical address=213 of the physical memory 800, and intermediate address=202 corresponding to it is registered in the entry of logical address=201 of the translation table 600. In addition, logical address=201 is written in correspondence with physical address=213 of the physical memory 800.

Figure 7B:
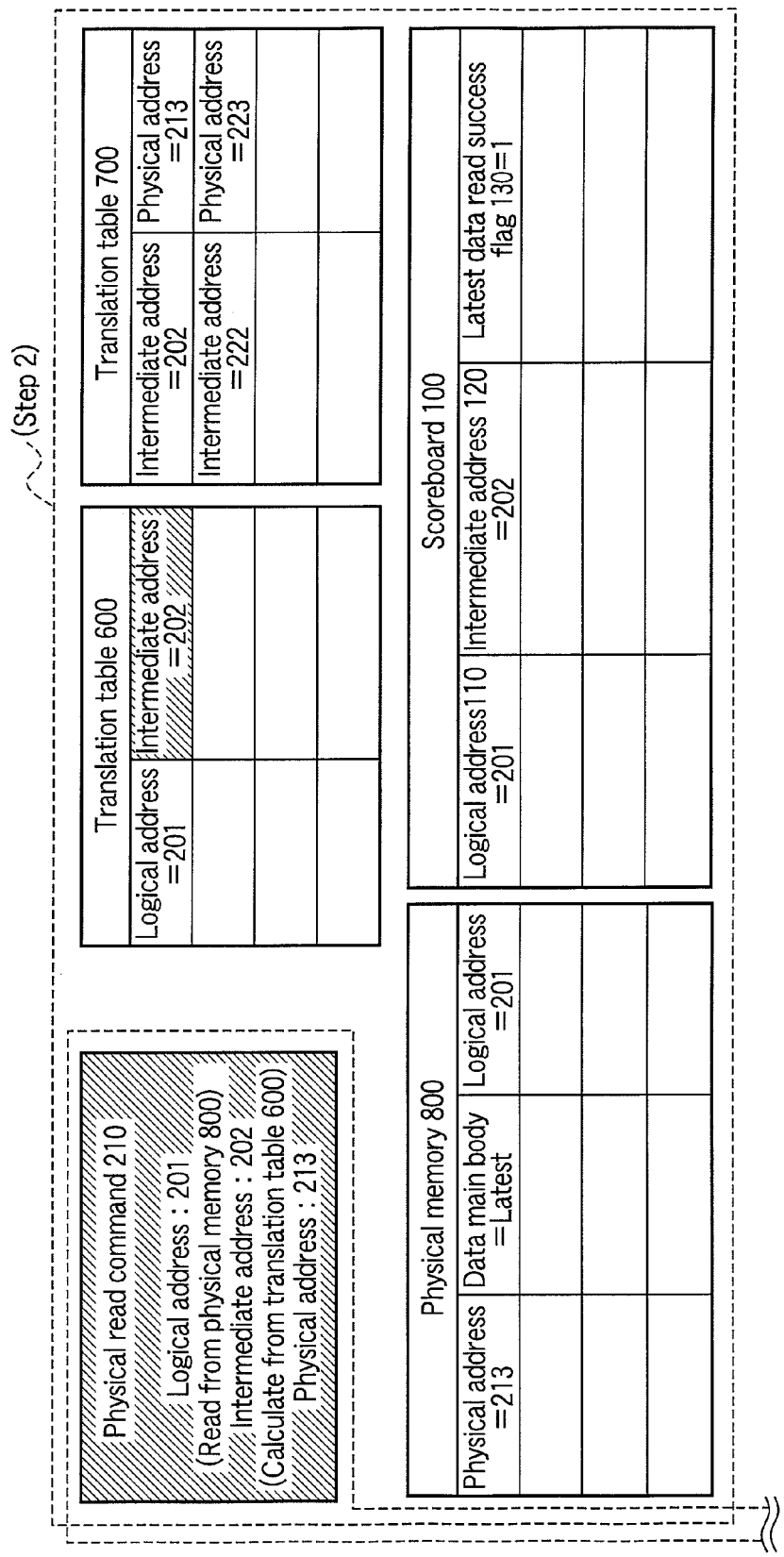
FIG. 7B is a view showing an operating state different from that in FIG. 7A.

FIG. 7B (step 2) shows the state after the physical read command 210 has been executed as part of data move processing. After the data is read from physical address=213 of the physical memory 800 based on the physical read command 210, the translation table 600 is searched based on logical address=201 on the physical memory 800 to obtain intermediate address=202 (S27 in FIG. 4). Next, the translation table 700 is searched based on intermediate address=202 to obtain physical address=213 (S28 in FIG. 4). Since physical address=213 obtained via the translation tables 600 and 700 equals physical address=213 upon executing the read command 210, it is determined that the read of the latest data has succeeded (S29 in FIG. 4). At last, the logical address 110=201, the intermediate address 120=202, and the latest data read success flag 130=1 are registered in the scoreboard 100 (S30 in FIG. 4).

Figure 7C:
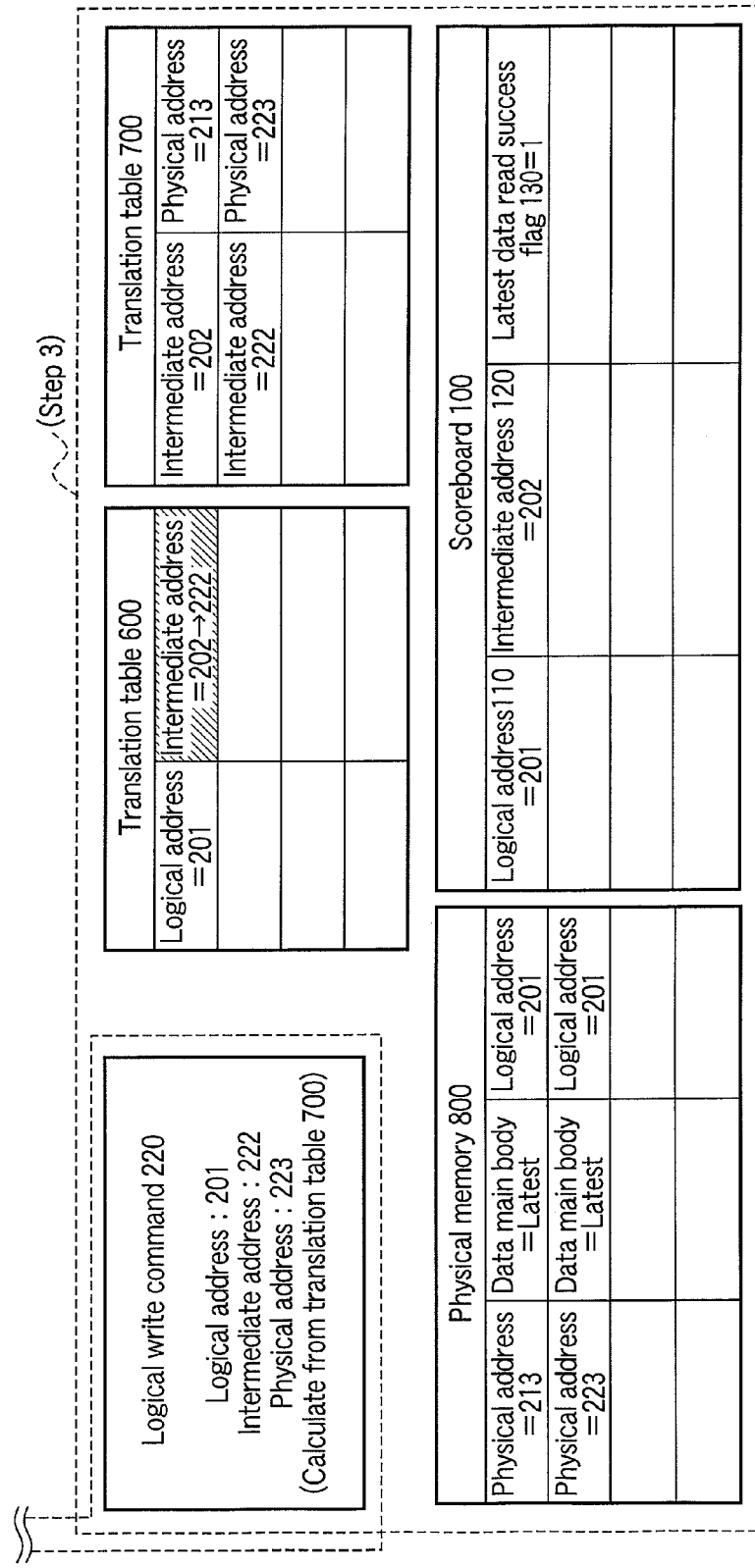
FIG. 7C is a view showing an operating state different from that in FIG. 7B.

FIG. 7C (step 3) shows the state after a logical write command 220 has been executed as part of data move processing. More specifically, after the write has been executed at physical address=223 of the physical memory 800 based on the logical write command 220 supplied from the table update unit 500, the next determination is done before updating the translation table 600.

First, the translation table 600 is searched based on logical address=201 to obtain intermediate address=202 registered immediately before (S33 in FIG. 4). Next, the scoreboard 100 is searched based on logical address=201 to obtain intermediate address=202 and the latest read success flag registered there (S34 in FIG. 4). After that, the latest read success flag 130 is determined (S35 in FIG. 4). In this case, since the latest read success flag 130 is "1", the intermediate address 120=202 read from the scoreboard 100 is compared with intermediate address=202 obtained from the translation table 600 (S36 in FIG. 4). Since these values equal, it is found that the user write command has not been executed after execution of the physical read command 210 before execution of the logical write command 220. In addition, since the latest read success flag is "1", the absence of the user write command interrupt before execution of the physical read command 210 can also be confirmed.

After confirming those, the entry of logical address=201 of the translation table 600 is updated from intermediate address=202 to 222. Hence, the position of latest data corresponding to logical address=201 is indicated by physical address=223 (S24 in FIG. 4).

FIGS. 8A, 8B, 8C, and 8D show a case in which execution of user write before the logical write command of data move processing is detected using the scoreboard 100 when this embodiment is used.

Figure 8A:
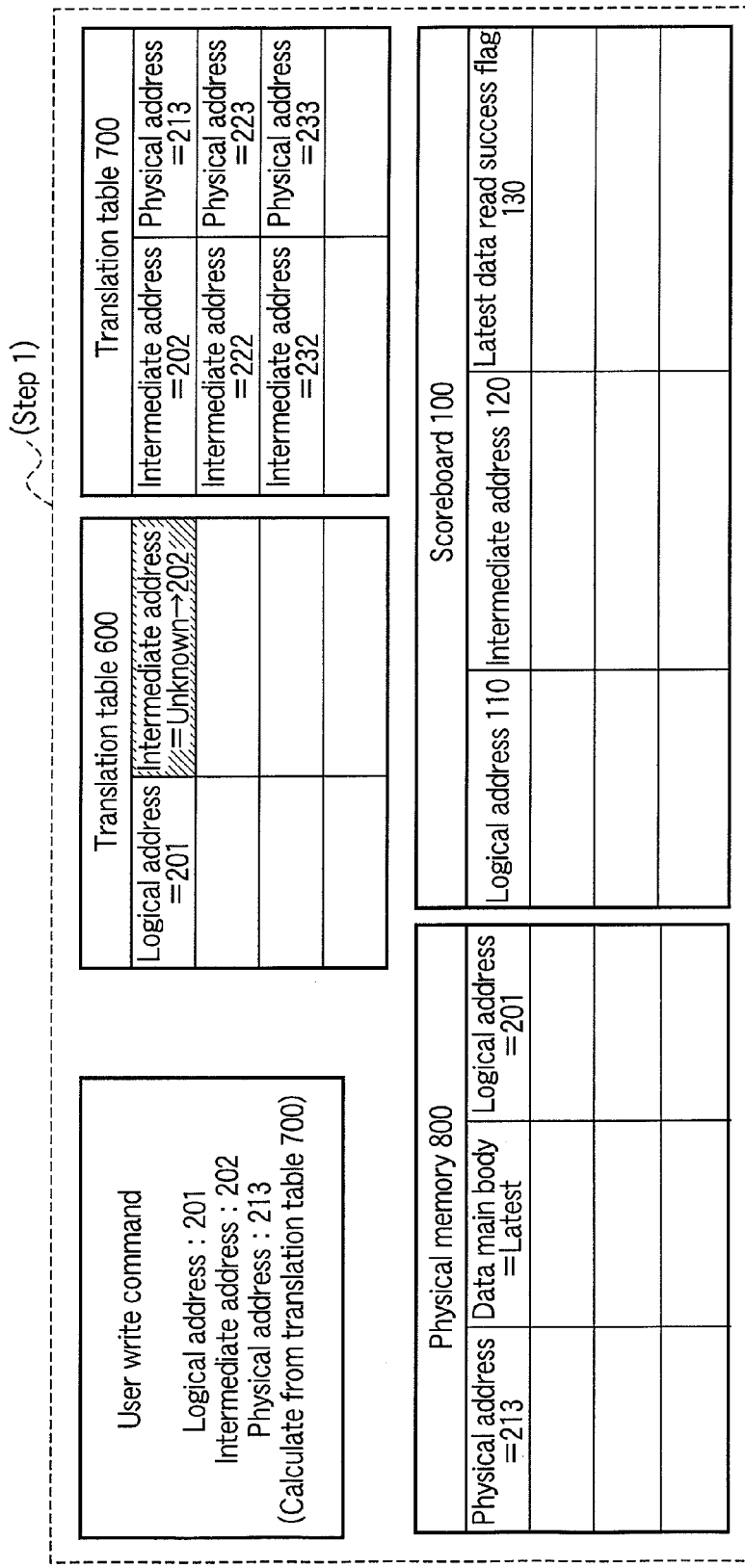
FIG. 8A is a view showing part of the arrangement in FIG. 2 so as to indicate the operation of the embodiment different from those in FIGS. 7A to 7C.
Figure 8B:
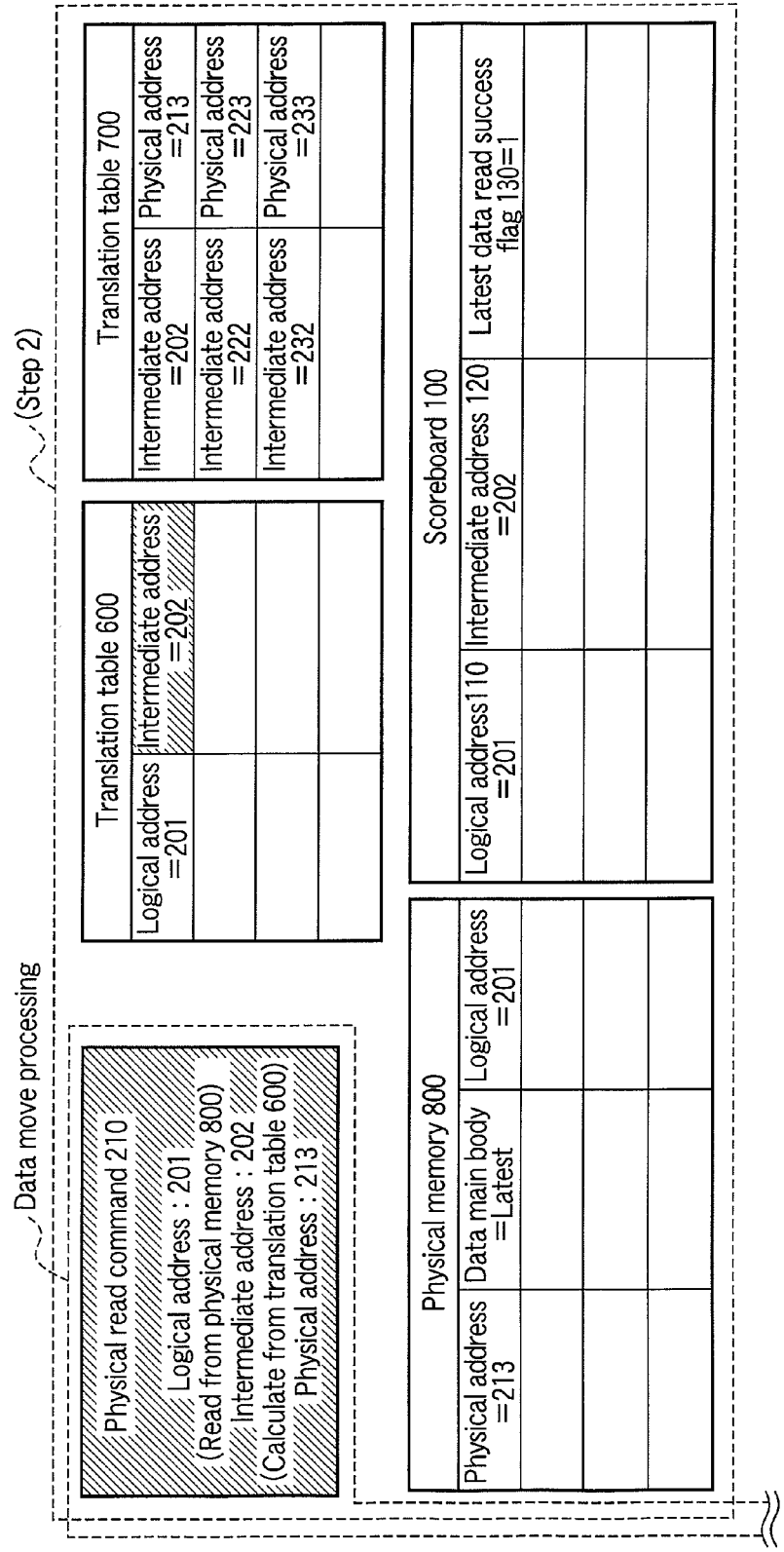
FIG. 8B is a view showing an operating state different from that in FIG. 8A.
Figure 8C:
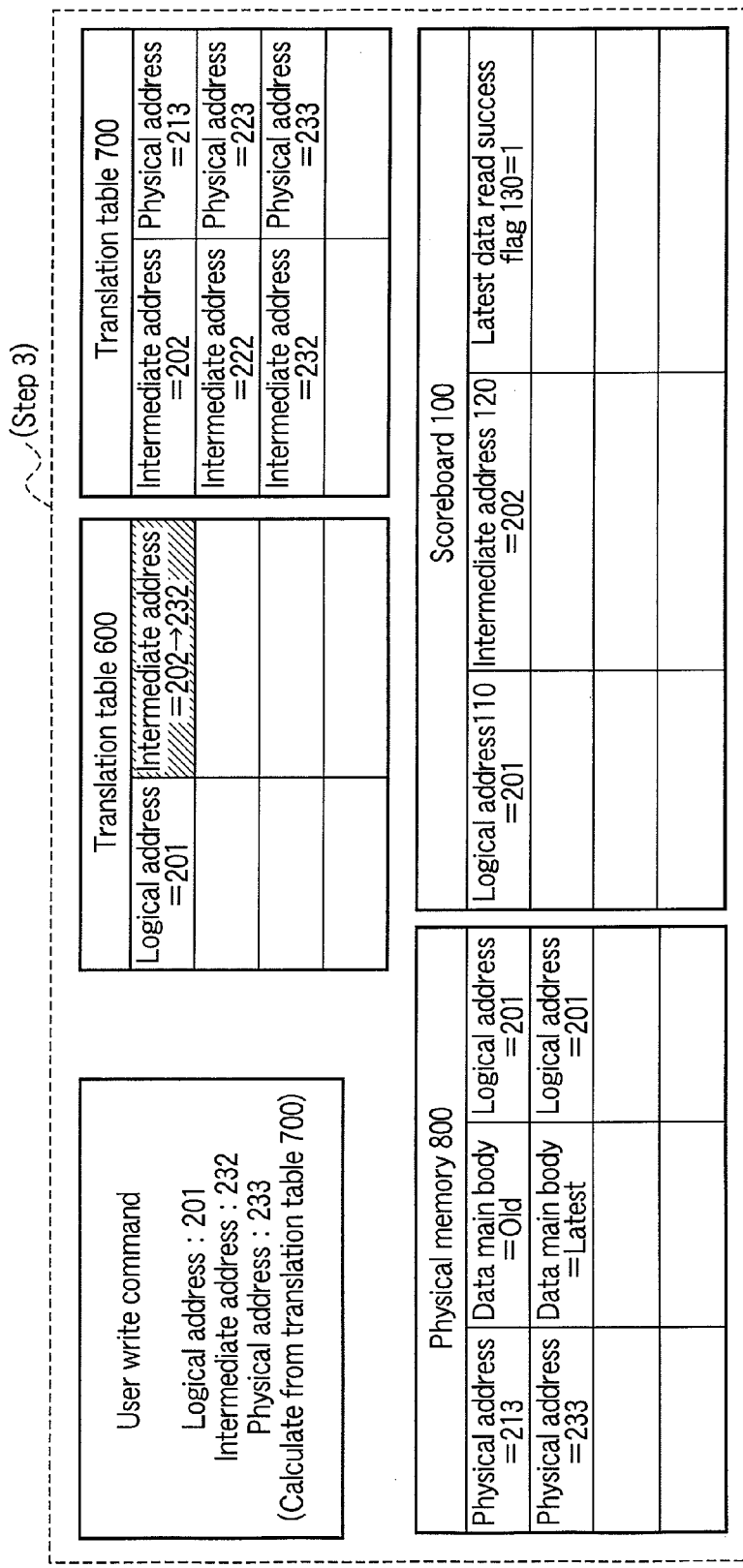
FIG. 8C is a view showing an operating state different from that in FIG. 8B.
Figure 8D:
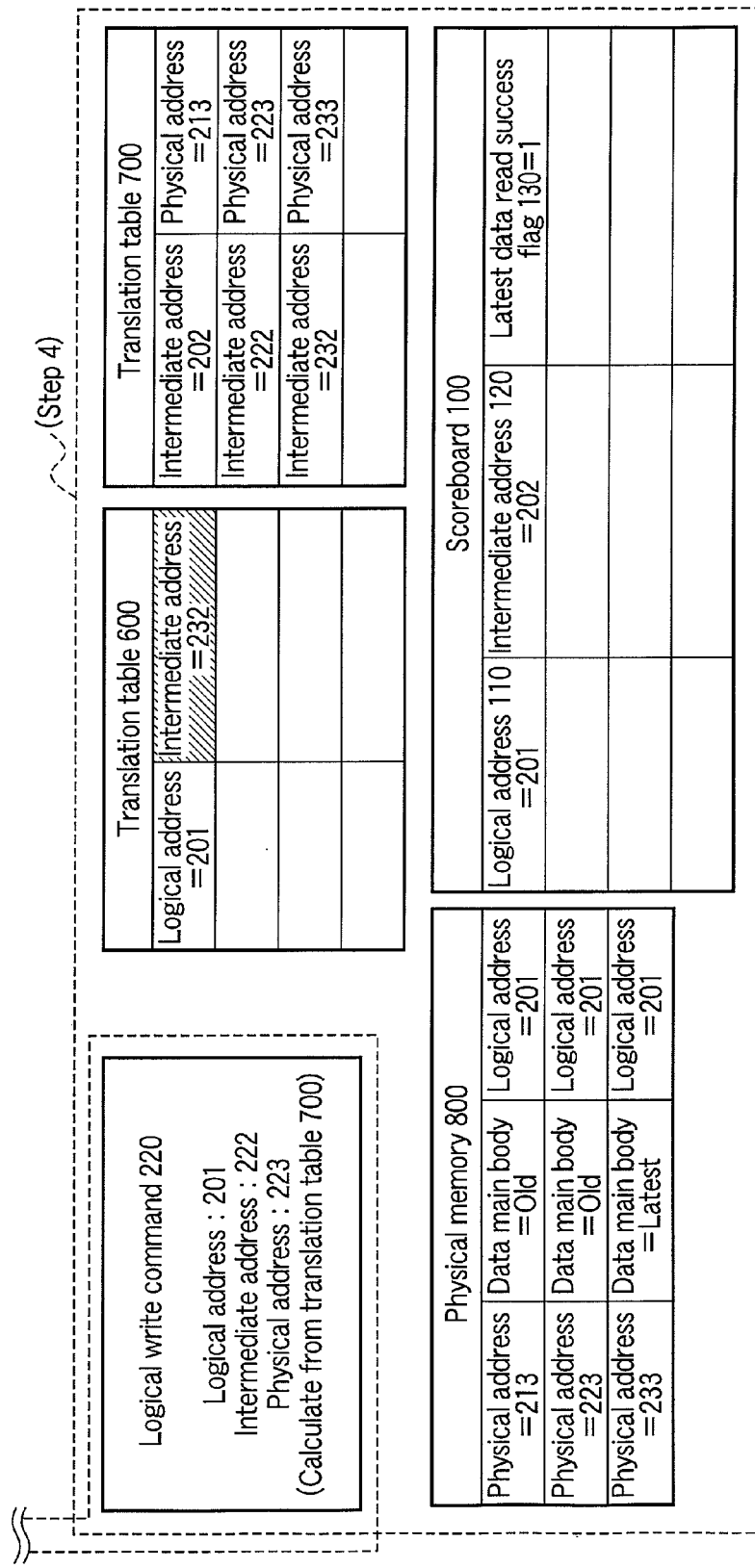
FIG. 8D is a view showing an operating state different from that in FIG. 8C.

More specifically, the user write command is executed in FIG. 8C (step 3) between the physical read command 210 of data move processing shown in FIG. 8B (step 2) and the logical write command 220 shown in FIG. 8D (step 4).

FIG. 8A (step 1) and FIG. 8B (step 2) are the same as FIGS. 7A and 7B. FIG. 8C (step 3) shows a state in which the user write command is executed for the logical address 201, and the entry of logical address=201 of the translation table 600 is updated to intermediate address=232. FIG. 8B (step 2) shows a state in which the data of physical address=213 read from the physical memory 800 has become old.

FIG. 8D (step 4) shows a state after execution of the logical write command 220 as part of data move processing. In this case, latest intermediate address=232 corresponding to logical address=201 is obtained from the translation table 600 in accordance with the logical write command 220 (S33 in FIG. 4). Next, the intermediate address 120=202 and the latest read success flag 130=1 are obtained from the scoreboard 100 in accordance with the logical address 110=201 (S34 in FIG. 4).

Then, the latest read success flag is determined (S35 in FIG. 4). In this case, since the latest read success flag 130 is "1", intermediate address=232 obtained from the translation table 600 is compared with intermediate address=202 obtained from the scoreboard 100 (S36 in FIG. 4). Since they do not match upon comparison, execution of the user write command after execution of the physical read command 210 before execution of the logical write command 220 is detected. When the mismatching is detected, the data written by the logical write command 220 is the old data in FIG. 8B (step 2). For this reason, the CPU 15 is notified of the processing according to the logical write command 220 without updating the translation table 600 (S25 in FIG. 4). Hence, the logical write command 220 is invalidated. That is, the data move processing is invalidated.

That the latest data corresponding to logical address=201 is that of intermediate address=232 and physical address=233 written in FIG. 8C (step 3) is obtained from the translation tables 600 and 700. Hence, the position of the latest data can correctly be managed.

FIGS. 9A, 9B, 9C, and 9D show a case in which execution of user write before the physical read command of data move processing is detected using the scoreboard when this embodiment is used.

Figure 9A:
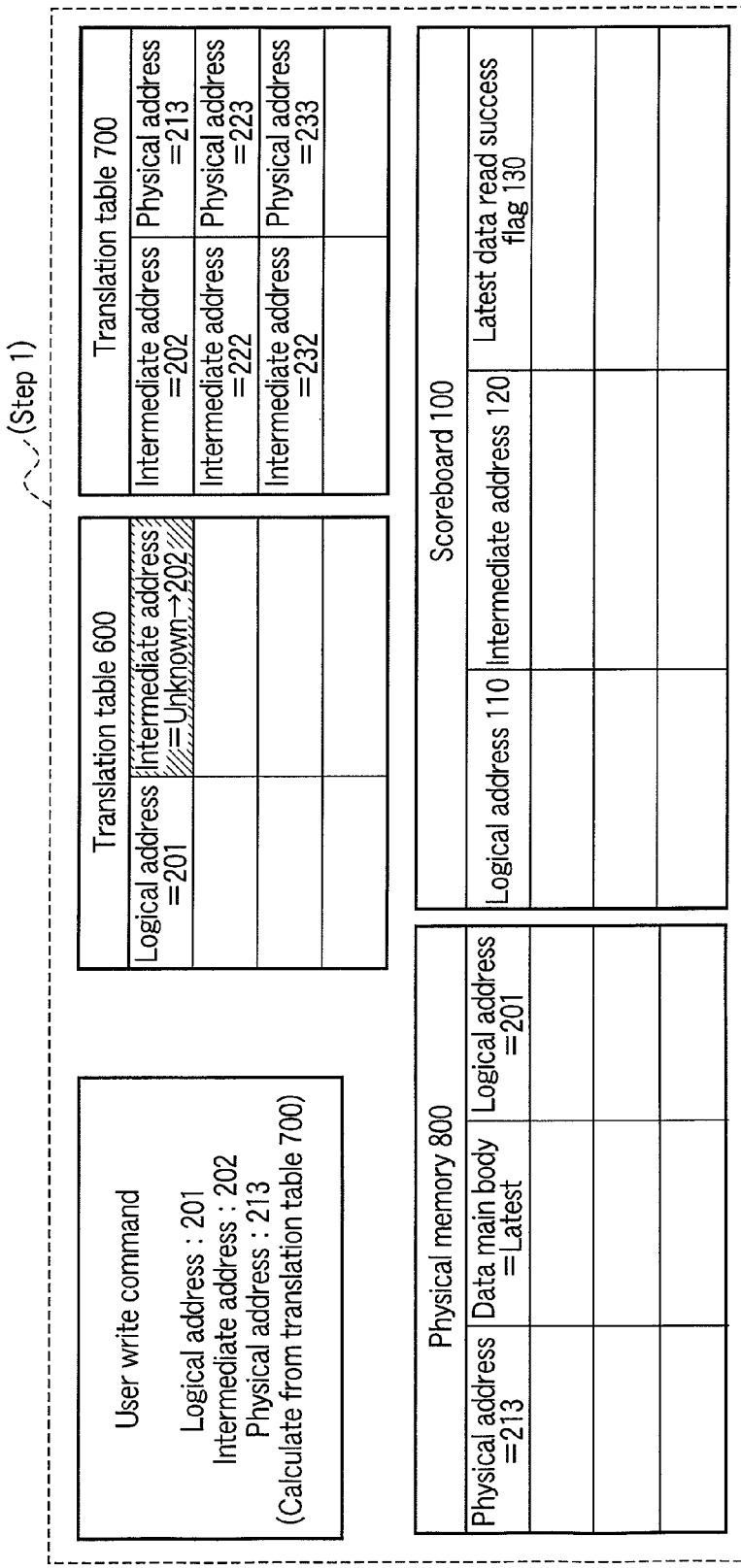
FIG. 9A is a view showing part of the arrangement in FIG. 2 so as to indicate the operation of the embodiment different from those in FIGS. 7A to 7C and FIGS. 8A to 8D.

FIG. 9A (step 1) is the same as FIG. 8A.

Figure 9B:
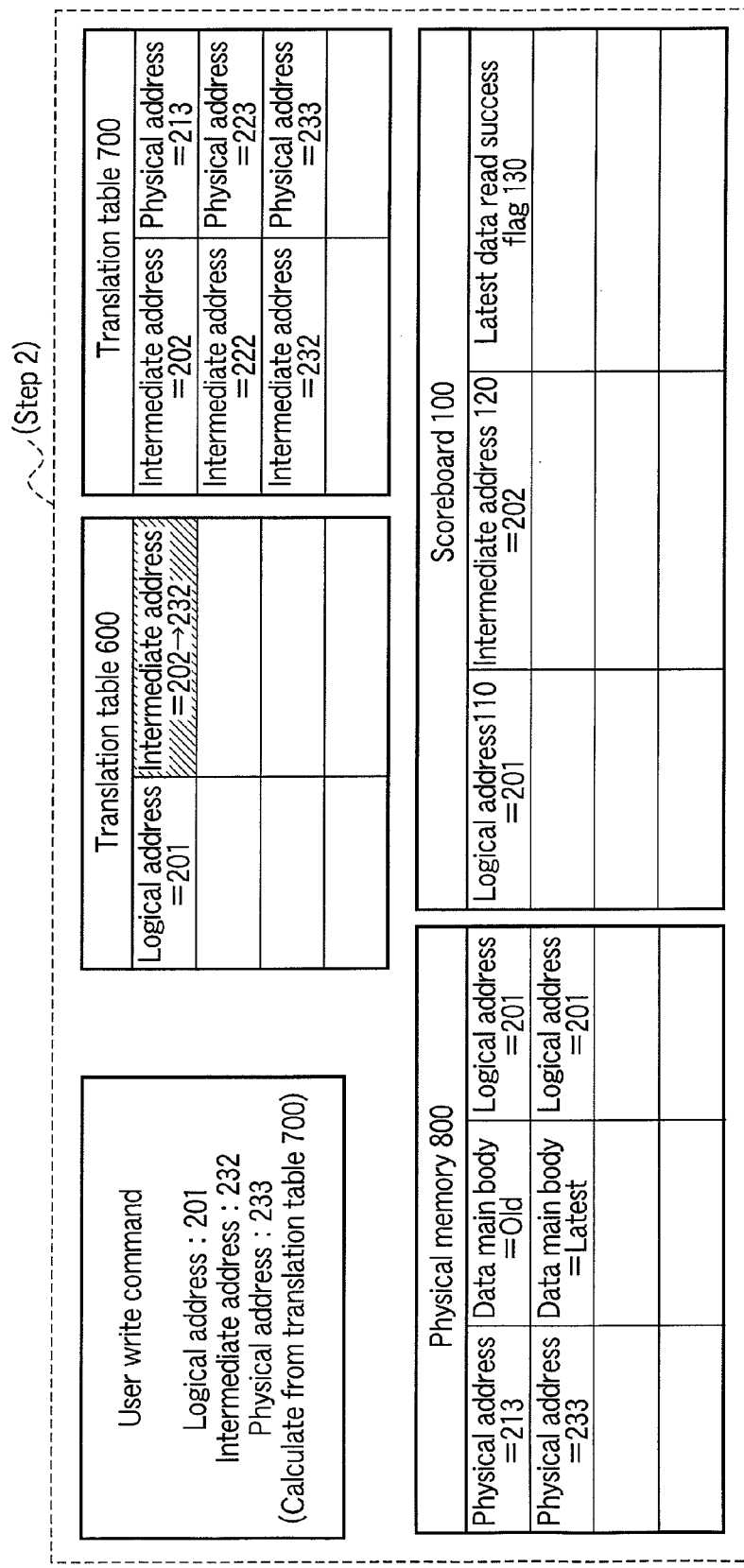
FIG. 9B is a view showing an operating state different from that in FIG. 9A.
Figure 9C:
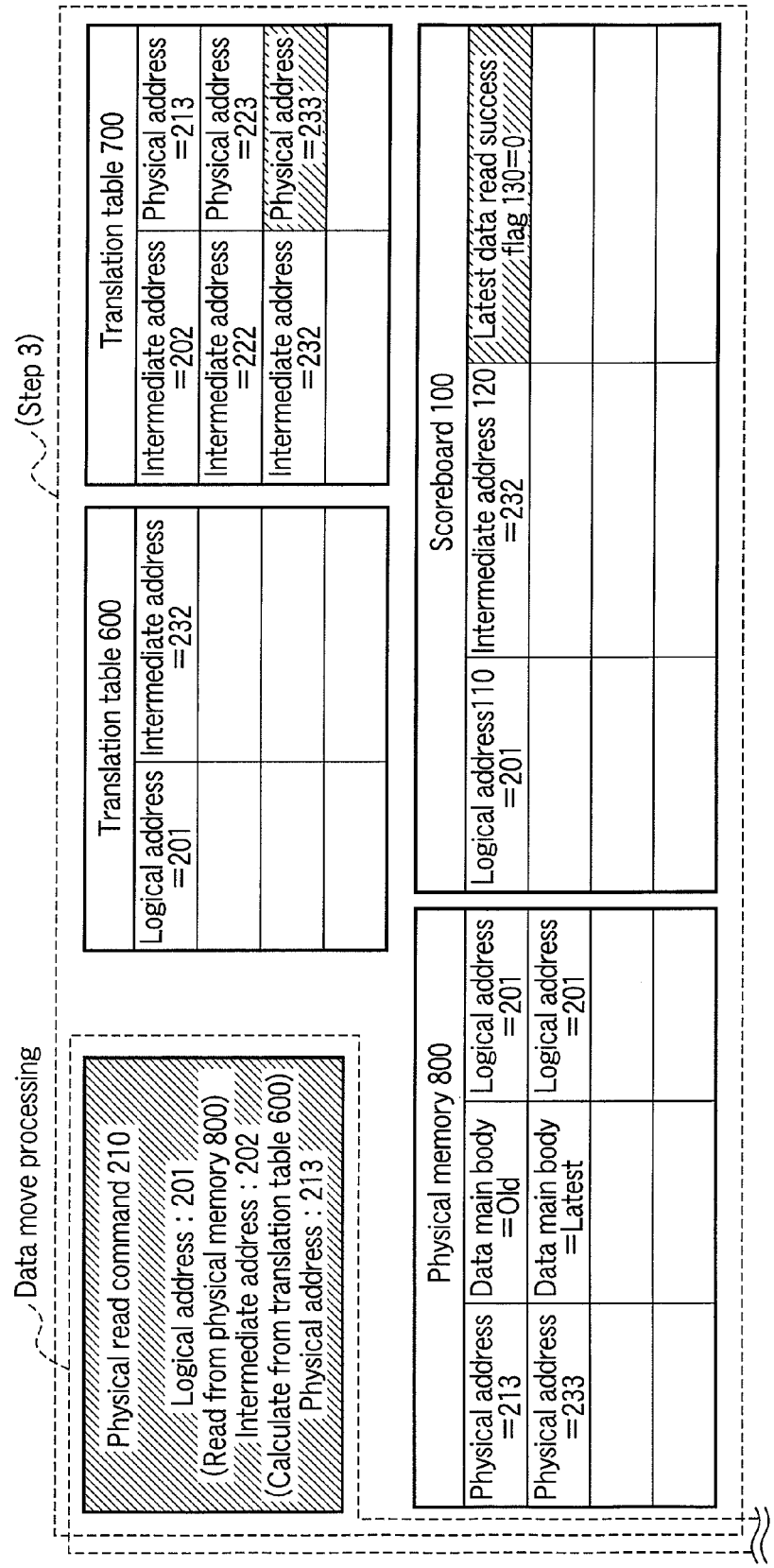
FIG. 9C is a view showing an operating state different from that in FIG. 9B.

FIG. 9B (step 2) shows a state in which the user write command is executed after the software has calculated the physical address to be used in FIG. 9C (step 3). The latest data is written at physical address=233 of the physical memory 800. Intermediate address=232 obtained from the translation table 700 is registered in the entry of logical address=201 of the translation table 600.

FIG. 9C (step 3) shows a state after the physical read command 210 as part of data move processing has been executed. Data position calculation of the physical read command 210 is done by the software before FIG. 9B (step 2). Hence, the data of physical address=213 that is not the latest at this point of time is read. As in FIG. 8B (step 2), the translation table 600 is searched based on logical address=201 on the physical memory 800 to obtain intermediate address=232 (S27 in FIG. 4). The translation table 700 is searched based on the obtained intermediate address=232 to obtain physical address=233 (S28 in FIG. 4). Physical address=233 obtained via the translation tables 600 and 700 is compared with physical address=213 added to the physical read command. However, these intermediate addresses do not match, it is found that the read of the latest data has failed. For this reason, the latest read success flag is determined to be "0" (S29 in FIG. 4). After that, the logical address 110=201, the intermediate address 120=232, and the latest read success flag 130="0" are registered in the scoreboard 100 (S30 in FIG. 4).

Figure 9D:
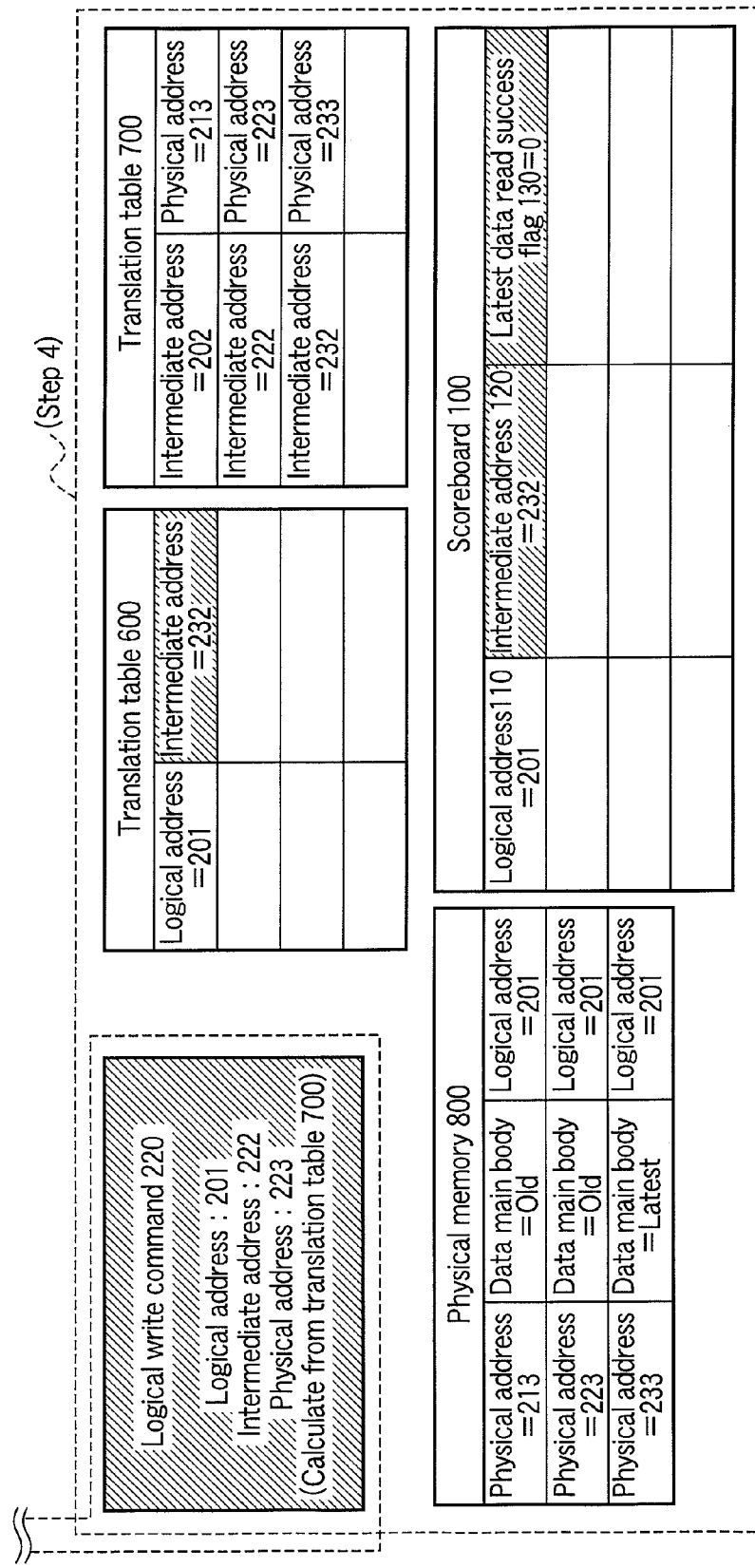
FIG. 9D is a view showing an operating state different from that in FIG. 9C.

FIG. 9D (step 4) shows a state after execution of the logical write command 220 as part of data move processing. Immediately preceding registered intermediate address=232 obtained from the translation table 600 (S33 in FIG. 4), and the intermediate address 120=232 and the latest read success flag recorded in the scoreboard 100 are read in accordance with the logical write command 220 from the table update unit 500 (S34 in FIG. 4). After that, the latest read success flag is determined to be "0" (S35 in FIG. 4). Accordingly, the presence of the user write command interrupt before execution of the physical read command 210 is detected. If this is detected, the data written by the logical write command 220 is the old data written in FIG. 9C (step 3). For this reason, the CPU 15 is notified of the processing according to the logical write command 220 without updating the translation table 600 (S25 in FIG. 4). Hence, the logical write command 220 is invalidated. That is, the data move processing is invalidated.

That the latest data corresponding to logical address=201 is that of intermediate address=232 and physical address=233 written in FIG. 9B (step 2) is obtained from the translation tables 600 and 700. Hence, the position of the latest data can correctly be managed.

According to this embodiment, the scoreboard 100 is provided, and the intermediate address 120 and the latest data read success flag 130 are registered in the scoreboard 100 in correspondence with the logical address 110. For this reason, in the data move processing, the intermediate address and the latest read success flag 130 registered in the scoreboard 100 are confirmed by the logical write command after execution of the physical read command, thereby confirming whether the user write command has been executed after the execution of the physical read command before the execution of the logical write command. It is therefore unnecessary to prohibit the user write command to the same logical address even during execution of data move processing. Hence, it is possible to prevent the processing speed of the user write command from lowering.

Additionally, if the latest read success flag is "0", the presence of the user write command interrupt before execution of the physical read command 210 can be confirmed. In this case, in the data move processing, the position of the latest data can correctly be managed because the translation table 600 is not updated.

Note that although the latest data read success flag 130 of the scoreboard 100 is set in accordance with the physical read command 210, the embodiment is not limited to this. For example, it may be set in accordance with the user write command.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   a memory unit;
   a first storage unit configured to store a logical address and an intermediate address, the intermediate address corresponding to the logical address and being used to estimate a physical address of the memory unit;
   a second storage unit configured to store the intermediate address and the physical address corresponding to the intermediate address;
   a third storage unit configured to store a flag corresponding to the logical address and the intermediate address, the flag representing whether a read of latest data by a read operation using the logical address and the intermediate address has succeeded;
   a data move unit configured to move data in the memory unit; and
   a controller configured to, when the data move unit moves the data in the memory unit, and the flag stored in the third storage unit represents a success of the read of the latest data, determine whether a write has been done for the same logical address of the memory unit during the data move, and, if the write has been done, invalidate the data move.

2. The device of claim 1, further comprising an update unit connected to the first storage unit, the second storage unit, and the third storage unit to update contents of the first storage unit, the second storage unit, and the third storage unit.

3. The device of claim 2, wherein, if the latest data is read from the memory unit when the data move unit moves the data in the memory unit, the update unit sets, in the third storage unit, the flag representing the success.

4. The device of claim 2, wherein, if the latest data is not read from the memory unit when the data move unit moves the data in the memory unit, the update unit sets, in the third storage unit, the flag representing a failure.

5. A memory control method comprising:
   in move processing of data in a memory unit, reading the data from the memory unit based on a first physical address of the memory unit in accordance with a read command;
   if the read data is latest data, setting, in a storage unit, a flag representing that the read of the latest data has succeeded;

writing the read latest data in the memory unit based on a second physical address in accordance with a write command; and when the flag stored in the storage unit represents a success of the read of the latest data, determining whether a write has been done for the same logical address of the memory unit during the data move processing, and, if the write has been done, invalidating the data move processing.

6. A memory device comprising:

a memory unit;

a data buffer including a first table and a second table, the first table storing an intermediate address corresponding to a logical address, and the second table storing the intermediate address and a physical address;

a back end including a third table storing a flag corresponding to the logical address and the intermediate address; and a data move unit configured to move data in the memory unit, wherein, when the data move unit moves the data in the memory unit, and the flag in the third table represents a success of a read of latest data, the back end determines whether a write has been done for the same logical address of the memory unit, and, if the write has been done, invalidates the data move.

7. The device of claim 6, wherein the intermediate address corresponds to the logical address and is used to estimate a physical address of the memory unit.

8. The device of claim 6, wherein the flag represents whether the read of the latest data by a read operation using the logical address and the intermediate address has succeeded.

9. The device of claim 6, wherein the back end includes an update unit configured to update contents of the first table, the second table, and the third table.

10. The device of claim 9, wherein, if the latest data is read from the memory unit when the data move unit moves the data in the memory unit, the update unit sets, in the third table, the flag representing the success.

11. The device of claim 9, wherein, if the latest data is not read from the memory unit when the data move unit moves the data in the memory unit, the update unit sets, in the third table, the flag representing a failure.

* * * * *